US008802784B2

(12) United States Patent
Bruno

(10) Patent No.: US 8,802,784 B2
(45) Date of Patent: Aug. 12, 2014

(54) FUNCTIONALIZED POLYMERS AND METHODS OF MAKING

(76) Inventor: Joseph W. Bruno, Higganum, CT (US)

( * ) Notice: Subject to any disclaimer, the term of this patent is extended or adjusted under 35 U.S.C. 154(b) by 1056 days.

(21) Appl. No.: 12/808,412

(22) PCT Filed: Dec. 19, 2008

(86) PCT No.: PCT/US2008/087568
§ 371 (c)(1),
(2), (4) Date: Feb. 1, 2012

(87) PCT Pub. No.: WO2009/086037
PCT Pub. Date: Jul. 9, 2009

(65) Prior Publication Data
US 2012/0123059 A1    May 17, 2012

Related U.S. Application Data

(60) Provisional application No. 61/014,847, filed on Dec. 19, 2007.

(51) Int. Cl.
| | | |
|---|---|---|
| *C08F 293/00* | (2006.01) | |
| *C08F 4/72* | (2006.01) | |
| *C08F 216/18* | (2006.01) | |
| *C08F 220/14* | (2006.01) | |
| *C08F 216/16* | (2006.01) | |
| *C08F 220/06* | (2006.01) | |
| *C08F 10/06* | (2006.01) | |
| *C08F 10/00* | (2006.01) | |
| *C08F 4/64* | (2006.01) | |

(52) U.S. Cl.
CPC ............... *C08F 293/00* (2013.01); *C08F 4/72* (2013.01); *C08F 216/18* (2013.01); *C08F 220/06* (2013.01); *C08F 220/14* (2013.01); *C08F 216/16* (2013.01); *C08F 10/06* (2013.01); *C08F 10/00* (2013.01); *C08F 4/64048* (2013.01); *C08F 2500/03* (2013.01)
USPC ........... 525/297; 525/299; 526/329; 526/309; 526/332; 526/172; 524/556

(58) Field of Classification Search
CPC ........ C08F 293/00; C08F 10/06; C08F 10/00; C08F 4/72; C08F 210/06; C08F 216/18; C08F 220/06; C08F 220/14; C08F 4/64048; C08F 2500/03
USPC .......... 525/297, 299; 526/329, 309, 332, 172; 524/556
See application file for complete search history.

(56) References Cited

U.S. PATENT DOCUMENTS

| | | | |
|---|---|---|---|
| 5,130,389 A | * | 7/1992 | Ahmed et al. ................. 526/240 |
| 6,784,266 B2 | * | 8/2004 | Kim et al. ..................... 526/259 |
| 2003/0219535 A1 | | 11/2003 | Chang et al. |

FOREIGN PATENT DOCUMENTS

| | | | | |
|---|---|---|---|---|
| EP | 1834970 A1 | * | 9/2007 | |
| JP | 04130108 A | * | 5/1992 | |
| KR | 102040011915 | | 2/2004 | |

OTHER PUBLICATIONS

Nicolay et al. "Synthesis and Evaluation of a Functional, Water- and Organo-Soluble Nitroxide for "Living" Free Radical Polymerization", Macromolecules, (2007), 40(17), 6067-6075.*
Nicolay et al. "Synthesis and Evaluation of a Functional, Water- and ® rgano-Soluble Nitroxide for "Living" Free Radical Polymerization", Macromolecules, (2007), 40(17), 6067-6075.*
Husseman et al. "Controlled Synthesis of Polymer Brushes by "Living" Free Radical Polymerization Techniques", Macromolecules, (1999), 32(5), 1424-1431.*
International Search Report for International Application No. PCT/US2008/087568 mailed Aug. 6, 2009, 4 pages.
Written Opinion for International Application No. PCT/US2008/087568, mailed Aug. 6, 2009, 5 pages.

* cited by examiner

*Primary Examiner* — Michael Bernshteyn
(74) *Attorney, Agent, or Firm* — Cantor Colburn LLP

(57) ABSTRACT

Disclosed herein are copolymers comprising functional groups attached to the backbone of the polymer and methods of making these polymers.

4 Claims, No Drawings

FUNCTIONALIZED POLYMERS AND METHODS OF MAKING

CROSS REFERENCE TO RELATED APPLICATIONS

This application claim priority to and is a national stage application of PCT Application No. PCT/US08/087568 filed on Dec. 19, 2008. PCT Application No. PCT/US08/087568 claims the benefit U.S. Provisional Application No. 61/014, 847 filed on Dec. 19, 2007. PCT Application No. PCT/US08/087568 is incorporated by reference herein in its entirety.

BACKGROUND OF INVENTION

This invention relates to functionalized polymers and in particular functionalized polyolefins and functionalized poly (alkenyl aromatic) polymers.

Polyolefins such as polyethylene and polypropylene and poly(alkenyl aromatic) polymers such as polystyrene are widely used in a range of applications. In order to extend their usefulness researchers have long sought to introduce functional groups to these polymers to modify physical properties and enhance favorable interactions with other polymers and materials. To date successful attempts have been limited. Grafting has allowed the introduction of functional groups attached to the backbone but the resulting functional groups are not part of the polymer backbone and frequently occur only at a limited number of locations along the backbone of the polymer. Some success has also been seen using protected groups on the monomers used in polymerization. However this approach is expensive and involves the use of extra materials and extra production steps, limiting viability on a commercial scale. Use of protected monomers can also affect the distribution of the protected monomer in the resulting polymer.

Accordingly, there remains a need for polymers having functional groups, particularly functional groups present on the polymer backbone and a method of making these polymers.

SUMMARY OF INVENTION

The aforementioned need is addressed, at least in part, by a copolymer comprising units of formula (I) and formula (II)

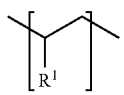

(I)

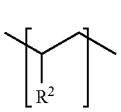

(II)

wherein the two units may be randomly incorporated, $R^1$ is an alkyl or aryl substituent, and $R^2$ is a functional group containing a heteroatom.

Also disclosed herein is a copolymer comprising units of formula (III)

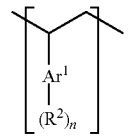

(III)

wherein $Ar^1$ is a $C_6$-$C_{20}$ aromatic hydrocarbyl, $R^2$ is a functional group comprising a hetero atom, and n is an integer having a value of 1 to the number of available valences on $Ar^1$.

A method of making the above-disclosed polymers comprises:
polymerizing a monomer mixture comprising a first monomer having a non-aromatic carbon-carbon double bond and a functional group comprising a heteroatom and a second monomer having a non-aromatic carbon-carbon double bond and an alkyl or aryl substituent in the presence of an activator and a catalyst of formula (IV)

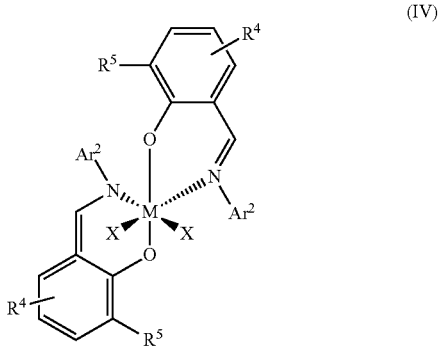

(IV)

wherein M is an early transition metal, X is independently at each occurrence a leaving group such as a halide, $R^5$ is independently at each occurrence a $C_4$-$C_{10}$ hydrocarbyl, $R^4$ is independently at each occurrence a hydrogen or $C_1$-$C_{10}$ hydrocarbyl, and $Ar^2$ is independently at each occurrence a $C_6$-$C_{12}$ aromatic hydrocarbyl.

The above-discussed and other features and advantages will be appreciated and understood by those skilled in the art from the following detailed description and drawings.

DETAILED DESCRIPTION

Surprisingly it has now been discovered that the synthesis of polymers comprising a functional group attached directly to the backbone is now possible. In some embodiments the copolymer has units comprising a functional group distributed throughout the polymer. In some embodiments the copolymer is a block copolymer having units comprising a functional group present in at least one block. Until now functionalized polymers such as functionalized polyolefins and functionalized polystyrene have only been available by grafting or through copolymerization using monomers having protected functional groups. Described herein are polymerizations of monomer mixtures comprising a monomer having a non-aromatic carbon-carbon double bond and a functional group. The polymerizations use an early transition metal organometallic catalyst and an activator, and employ a 2,1 insertion mechanism and result in living polymerization, where "living" is meant to describe a polymerization with few or no chain termination events. The resulting polymers have a functional group attached to the backbone and distributed throughout the polymer. The early transition metal organometallic catalyst comprises an early transition metal and one or more ligands. The early transition metal can be chosen from groups 3 to 6. The catalyst metal center has five to six coordination sites with 3 to 4 of these coordination sites occupied by one or more ligands. The remaining coordination sites are occupied by a leaving group such as a halide, alkoxy or aryloxy group, hydride, or alkyl. Combinations of leaving groups are also contemplated. In some embodiments an activator is also employed.

In one embodiment the aforementioned polymers are made by polymerizing a monomer mixture comprising a first monomer having a non-aromatic carbon-carbon double bond and a functional group comprising a heteroatom and a second monomer having a non-aromatic carbon-carbon double bond and an alkyl or aryl substituent in the presence of an activator and a catalyst of formula (IV)

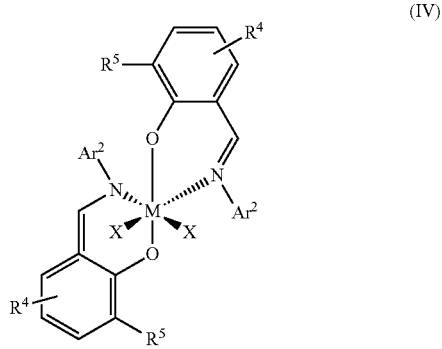

(IV)

wherein M is an early transition metal, X is independently at each occurrence a halide, alkoxy, aryloxy, hydride, or alkyl, $R^5$ is independently at each occurrence a $C_4$-$C_{10}$ hydrocarbyl, $R^4$ is independently at each occurrence a hydrogen or $C_1$-$C_{10}$ hydrocarbyl, and $Ar^2$ is independently at each occurrence a $C_6$-$C_{12}$ aromatic hydrocarbyl. Formula (IV) is not intended to specify a particular isomer and is merely a representation of the atom to atom connectivity in the molecule. Without being bound by theory, it is believed that the activator removes the X ligand to result in an organometallic complex having an empty coordination site which is available to catalyze the polymerization reaction. In some embodiments M is selected from groups 3 to 6, or, more specifically, selected from group 4. In some embodiments M is titanium or zirconium. In some embodiments X is independently at each occurrence a halide, or more specifically, chloride or bromide. In some embodiments $R^5$ is tert-butyl, $R^4$ is tert-butyl, and $Ar^2$ is an isomer of a poly-fluorinated aryl group; this may be pentafluorophenyl, 2,4-difluorophenyl, 2,3,5-trifluorophenyl, or similar. Moreover, the two ligands may be different, either by virtue of different substituents $R^4$, $R^5$, or aryl group $Ar^2$. Surprisingly the catalyst of formula (IV) maintains activity in the presence of unprotected functional groups and is able to catalyze the polymerization of monomers having both a non-aromatic carbon-carbon double bond and a functional group comprising a heteroatom.

The polymerization can be performed at a temperature of −78 to 100° C. In some embodiments polymerizations run at temperatures at or below 0° C. result in syndiotactic copolymers. Polymerizations run at temperatures above 0° C. can result in atactic copolymers. In some embodiments the reaction conditions are substantially oxygen free, substantially moisture free, or substantially oxygen and moisture free. Substantially oxygen free as used herein refers to conditions in which elemental oxygen has been removed in an amount sufficient to prevent rapid decomposition (i.e. in less than 24 hours) of the catalyst. Substantially free of moisture as used herein refers to conditions in which water has been removed in an amount sufficient to prevent rapid decomposition (i.e. in less than 24 hours) of the catalyst. The order of addition of the reactants, catalyst and activator is not particularly important except in situations wherein the polymerization of the monomer comprising a functional group is substantially slower. In these cases it can be advantageous to combine the alkene and/or aryl alkene with the catalyst and activator prior to adding the monomer with a functional group. In some embodiments the activator is combined with a non-polar organic solvent to form a first mixture. An alkene or aryl alkene is added to the first mixture to form a second mixture. The catalyst is dissolved or suspended in an organic solvent and added to the second mixture to form a third mixture. The monomer comprising a non-aromatic carbon-carbon double bond and a functional group is added to the third mixture to form a fourth mixture. The fourth mixture is maintained at the desired temperature to form the polymer.

In some embodiments the monomer comprising a non-aromatic carbon-carbon double bond and a functional group has the formula (V)

(V)

wherein $R^{10}$ is a hydrogen or $C_1$-$C_4$ aliphatic hydrocarbyl, $R^{11}$ is a $C_1$-$C_{10}$ aliphatic hydrocarbyl, y equals 0 or 1, and $R^{12}$ is a functional group comprising a carbonyl, an alkoxy, a carboxyl, an ester, an amine, a hydroxyl, a lactone, an acrylate, a methacrylate, ether, halide, sulfone or a combination comprising at least one of the foregoing. In some embodiments $R^{11}$ is a $C_1$ to $C_4$ aliphatic hydrocarbon, or, more specifically, a $C_1$ to $C_3$ aliphatic hydrocarbon, or, more specifically, a $C_1$ or $C_2$ hydrocarbon. When the monomer mixture comprises a monomer of formula (V) the monomer mixture may further comprise a $C_2$-$C_8$ alkene.

In some embodiments the monomer comprising a non-aromatic carbon-carbon double bond and a functional group has the formula (VI)

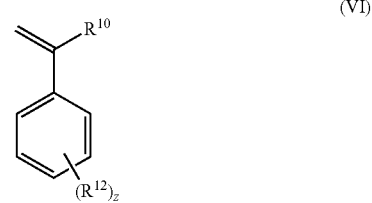

(VI)

wherein $R^{10}$ is a hydrogen or $C_1$-$C_4$ hydrocarbyl, z equals 1 to 5, $R^{12}$ is a functional group comprising a carbonyl, an alkoxy, a carboxyl, an ester, an amine, a hydroxyl, a lactone, an acrylate, a methacrylate, ether, halide, sulfone, or a combination comprising at least one of the foregoing, and z equals 1 to 5. When the monomer mixture comprises a monomer of formula (VI) the monomer mixture may further comprise a $C_8$-$C_{20}$ aryl alkene.

In one embodiment a copolymer comprises units of formula (I) and formula (II)

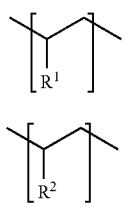

wherein the two units may be randomly incorporated, $R^1$ is an alkyl or aryl substituent, and $R^2$ is a functional group containing a heteroatom. Exemplary functional groups $R^2$ include a carbonyl, an alkoxy, a carboxyl, an ester, an amine, a hydroxyl, a lactone, an acrylate, a methacrylate, ether, halide, sulfone, or a combination comprising at least one of the foregoing.

In some embodiments the functional group is less than or equal to 3 bonds, or, more specifically, less than or equal to 2 bonds, or, even more specifically, 1 bond, from the backbone of the polymer. The polydispersity of the copolymer can be 1 to 1.5. The copolymer can have a weight average molecular weight of 15,000 to $10^7$, or, more specifically, 50,000 to 400,000 as determined by GPC using polystyrene standards.

In some embodiments the units of formula (I) and (II) are randomly distributed. In some embodiments the copolymer comprises less than or equal to 50 mole percent of the unit containing $R^2$, or, more specifically, less than or equal to 40 mole percent of the unit containing $R^2$, or, even more specifically, less than or equal to 30 mole percent of the unit containing $R^2$.

In some embodiments the copolymer further comprises units having a non-aromatic carbon-carbon double bond. Such polymers are typically the product of polymerizing a diene.

In some embodiments the copolymer comprises two or more chemically different units of formula (I). For example, one unit may comprise a lactone whereas another unit may comprise a carboxyl.

In some embodiments the copolymer is a block copolymer comprising a first block derived from the monomer containing $R^2$ and a second block comprising $C_2$-$C_8$ alkylene units. The first block may further comprise $C_1$-$C_8$ alkylene units. In some embodiments the block copolymer comprises a first block derived from the monomer containing $R^2$ and a second block having aryl alkylene units. The first block may further comprise $C_1$-$C_8$ alkylene units. Additionally copolymers having combinations of the foregoing blocks are also contemplated.

Also disclosed herein is a copolymer comprising units of formula (III)

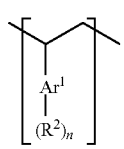

wherein $Ar^1$ is a $C_6$-$C_{20}$ aromatic hydrocarbyl and $R^2$ is a functional group comprising a heteroatom and n is an integer having a value of 1 to the number of available valences on $Ar^1$.

Exemplary functional groups include a carbonyl, an alkoxy, a carboxyl, an ester, an amine, a hydroxyl, a lactone, an acrylate, a methacrylate, ether, halide, sulfone, or a combination comprising at least one of the foregoing. In some embodiments the functional group is less than or equal to 9 bonds, or, more specifically, 5 bonds, or, more specifically, 3 bonds from the backbone of the polymer. In making the determination of the number of bonds from the backbone $Ar^1$ has not been included as part of the backbone. Thus, 3 bonds from the backbone would place $R^2$ ortho to the polymer backbone on $Ar^1$. The polydispersity of the copolymer can be 1 to 1.5. The copolymer can have a weight average molecular weight of 15,000 to $10^7$, or, more specifically, 50,000 to 400,000 as determined by GPC using polystyrene standards.

In some embodiments the units of formula (III) are randomly distributed among $C_6$-$C_{20}$ aryl alkylene units. In some embodiments the copolymer comprises less than or equal to 50 mole percent, or, more specifically, less than or equal to 40 mole percent, or, even more specifically, less than or equal to 30 mole percent of the units of formula (III).

In some embodiments the copolymer further comprises units having a non-aromatic carbon-carbon double bond. Such polymers are typically the product of polymerizing a diene.

In some embodiments the copolymer comprises two or more chemically different units of formula (II). For example, one unit may comprise a lactone whereas another unit may comprise a carboxyl. The units may also differ in the identity of $Ar^1$; for example, one unit may comprise a single aromatic ring and another unit may comprise fused aromatic rings.

In some embodiments the copolymer is a block copolymer comprising a first block having units of formula (III) and a second block comprising $C_2$-$C_8$ alkylene units. The first block may further comprise $C_6$-$C_{20}$ aryl alkylene units. In some embodiments the block copolymer comprises a first block having units of formula (III) and a second block having $C_6$-$C_{20}$ aryl alkylene units.

The above described polymers and polymerization reactions are further illustrated by the following non-limiting examples.

EXAMPLES

In an inert atmosphere glove box, 290 milligrams (mg) of solid methylaluminoxane (MAO) was dissolved in 100 milliliters (mL) of dried, nitrogen purged toluene. This solution was added to a glass pressure bottle with a magnetic stir bar and the reactor was assembled by adding a cap with burst disk, pressure gauge, quick-release adaptor, and stopcock valve with a rubber septum. In another container was prepared a solution with 30 milligrams of a catalyst (IV, with $R^4=R^5=$tert-butyl and $Ar^2=$pentafluorophenyl, and a molecular weight of 915 grams/mole) in 5 mL of toluene. This was taken up into a gas-tight syringe. Using a Schlenk line, gas inlet flasks, and syringes, another solution was prepared with 4.5 mL of dried, degassed comonomer, such as ethyl vinyl ether, dissolved in 5 mL of purified toluene.

The assembled pressure bottle with MAO/toluene solution was connected via quick-connect to source of propylene that had been passed through a purification column designed to remove moisture and oxygen. The pressure bottle was immersed in an ice bath at 0° C., and propylene was condensed in with stirring until approximately 100 mL of liquid propylene had been added. The observed pressure, which is the vapor pressure of propylene at 0° C., is approximately 30 psi. At this point the titanium catalyst solution was added by injecting it through the rubber septum and stopcock valve, initiating the polymerization reaction. After a set period of 5 to 10 minutes, the solution of ethyl vinyl ether in toluene was injected in a similar manner. The polymerization was allowed to continue for approximately 3 hours at 0° C.

A quenching solution was prepared by adding approximately 15 mL concentrated hydrochloric acid to approximately 500 mL of methanol. Approximately 5 mL of this quenching solution was injected into the pressure vessel via syringe, and the vessel was vented to release excess propylene. When venting subsided, the polymerization solution was poured into the remainder of the quenching solution and stirred until colorless (approximately 2-3 hours). This led to a suspension of copolymer which was isolated by filtration, washed with methanol, then dried in vacuo to give a colorless solid. Results are shown in Table 1.

TABLE 1

| Catalyst[a] | Co-Monomer[b] | % Incorporation of co-monomer[c] | $M_w$ | PDI[d] |
|---|---|---|---|---|
| $(3,5\text{-}F_2)$, $(2,3,5,6\text{-}F_4)$ | MA | 12.2 | 57,000 | 1.16 |
| $(3,5\text{-}F_2)$, $(2,3,5,6\text{-}F_4)$ | CVE | 4.5 | 54,000 | 1.14 |
| $(F_5)_2$ | EVE | 4.8 | 66,000 | 1.21 |
| $(F_5)$, $(3,5\text{-}Cl_2)$ | MA | 1.2 | 77,000 | 1.34 |

[a]Catalyst IV, with $R^4 = R^5$ = tert-butyl and fluorinated $Ar^2$ moieties with fluoride incorporation as indicated above. All polymerizations were with propylene and the indicated co-monomer.
[b]Co-monomers; MA = methyl acrylate, CVE = cyclohexyl vinyl ether, EVE = ethyl vinyl ether.
[c]Incorporation of co-monomer in the resulting co-polymer, from nuclear magnetic resonance studies.
[d]Polydispersity, $M_w/M_n$ from GPC studies.

In the specification and the claims, reference will be made to a number of terms, which shall be defined to have the following meanings. The terms "first," "second," and the like, "primary," "secondary," and the like, "(a)," "(b)" and the like, as used herein do not denote any order, quantity, or importance, but rather are used to distinguish one element from another. The endpoints of all ranges directed to the same component or property are inclusive of the endpoint and independently combinable. Reference throughout the specification to "one embodiment," "another embodiment," "an embodiment," "some embodiments," and so forth, means that a particular element (e.g., feature, structure, property, and/or characteristic) described in connection with the embodiment is included in at least one embodiment described herein, and may or may not be present in other embodiments. In addition, it is to be understood that the described element(s) may be combined in any suitable manner in the various embodiments. The singular forms "a", "an" and "the" include plural referents unless the context clearly dictates otherwise. "Optional" or "optionally" means that the subsequently described event or circumstance may or may not occur, and that the description includes instances where the event occurs and instances where it does not.

As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. For example, an aromatic hydrocarbyl may comprise an alkyl substituent, aryl substituent, arylalkyl substituent, alkylaryl substituent, or a combination of two or more of the foregoing substituents. However, when the hydrocarbyl residue is described as "substituted", it can contain heteroatoms over and above the carbon and hydrogen members of the substituent residue. Thus, when specifically described as substituted, the hydrocarbyl residue can also contain halogen atoms, nitro groups, cyano groups, carbonyl groups, carboxylic acid groups, ester groups, amino groups, amide groups, sulfonyl groups, sulfoxyl groups, sulfonamide groups, sulfamoyl groups, hydroxyl groups, alkoxyl groups, or the like, and it can contain heteroatoms within the backbone of the hydrocarbyl residue.

While several embodiments have been shown and described, various modifications and substitutions may be made thereto without departing from the spirit and scope of the invention. Accordingly, it is to be understood that the invention has been described by way of illustration and not limitation.

The invention claimed is:

1. A method of making a copolymer comprising:
polymerizing a monomer mixture comprising a first monomer having a non-aromatic carbon-carbon double bond and a second monomer having a non-aromatic carbon-carbon double bond and a functional group comprising a heteroatom in the presence of an activator and a catalyst of formula (IV)

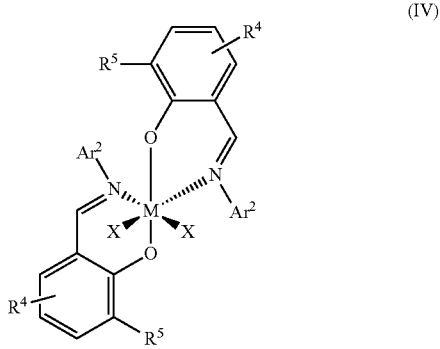

wherein M is an early transition metal, X is a leaving group, $R^5$ is independently at each occurrence a $C_4$-$C_{10}$ hydrocarbyl, $R^4$ is independently at each occurrence a hydrogen or $C_1$-$C_{10}$ hydrocarbyl, and $Ar^2$ is independently at each occurrence a $C_6$-$C_{12}$ aromatic hydrocarbyl.

2. The method of claim 1, wherein the activator comprises methylaluminoxane.

3. The method of claim 1, wherein the monomer is of formula (V)

wherein $R^{10}$ is a hydrogen or $C_1$-$C_4$ aliphatic hydrocarbyl, $R^{11}$ is a $C_1$-$C_{10}$ aliphatic hydrocarbyl, y equals 0 or 1, and $R^{12}$ is a functional group comprising a carbonyl, an alkoxy, a carboxyl, an ester, an amine, a hydroxyl, a lactone, an acrylate, a methacrylate, ether, halide, sulfone or a combination comprising at least one of the foregoing.

4. The method of claim 1, wherein the monomer is of formula (VI)
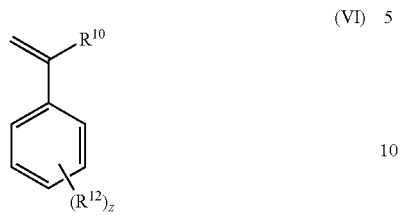
(VI)
wherein $R^{10}$ is a hydrogen or $C_1$-$C_4$ hydrocarbyl, n equals 1 to 5, $R^{12}$ is a functional group comprising a carbonyl, an alkoxy, a carboxyl, an ester, an amine, a hydroxyl, a lactone, an acrylate, a methacrylate, ether, halide, sulfone, or a combination comprising at least one of the foregoing, and z equals 1 to 5.
* * * * *